T. A. KILLMAN.
MOTOR OR PUMP.
APPLICATION FILED APR. 28, 1915.
1,221,333.
Patented Apr. 3, 1917.
4 SHEETS—SHEET 1.
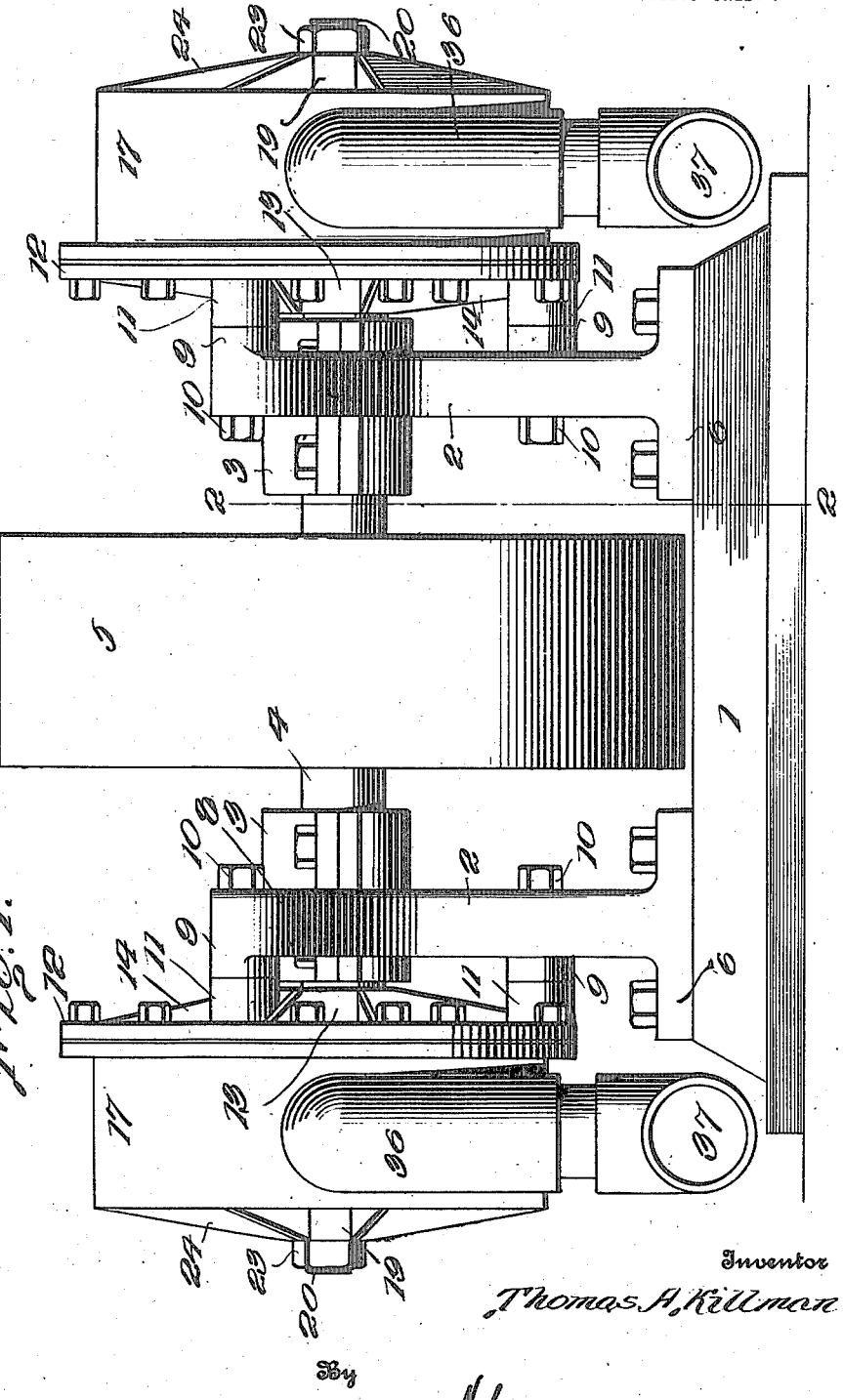
Inventor
Thomas A. Killman
By
Attorneys.

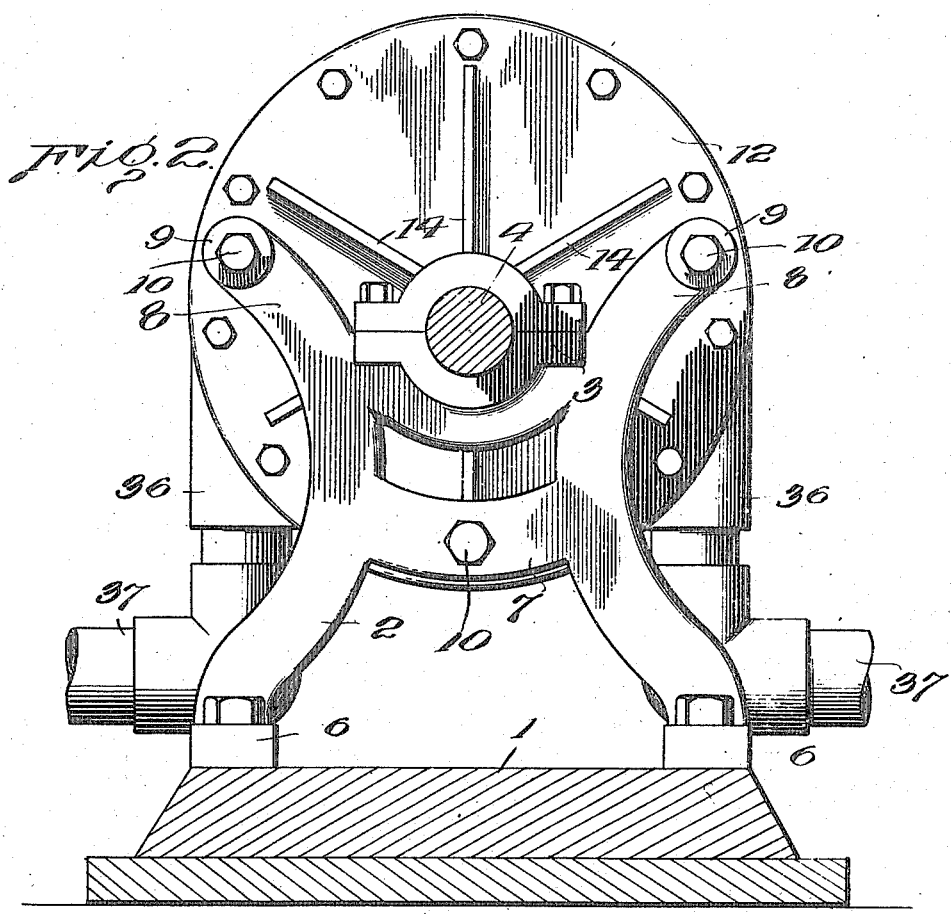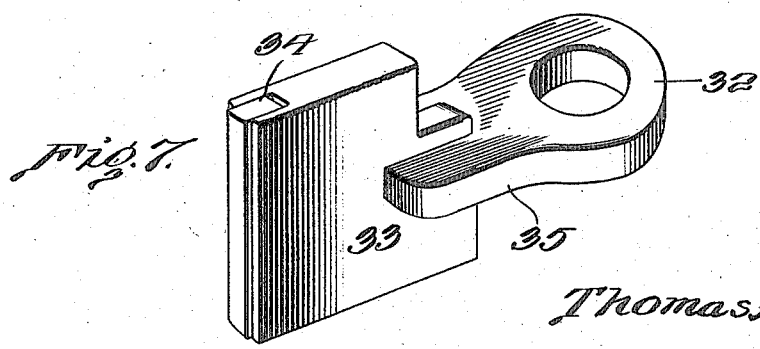

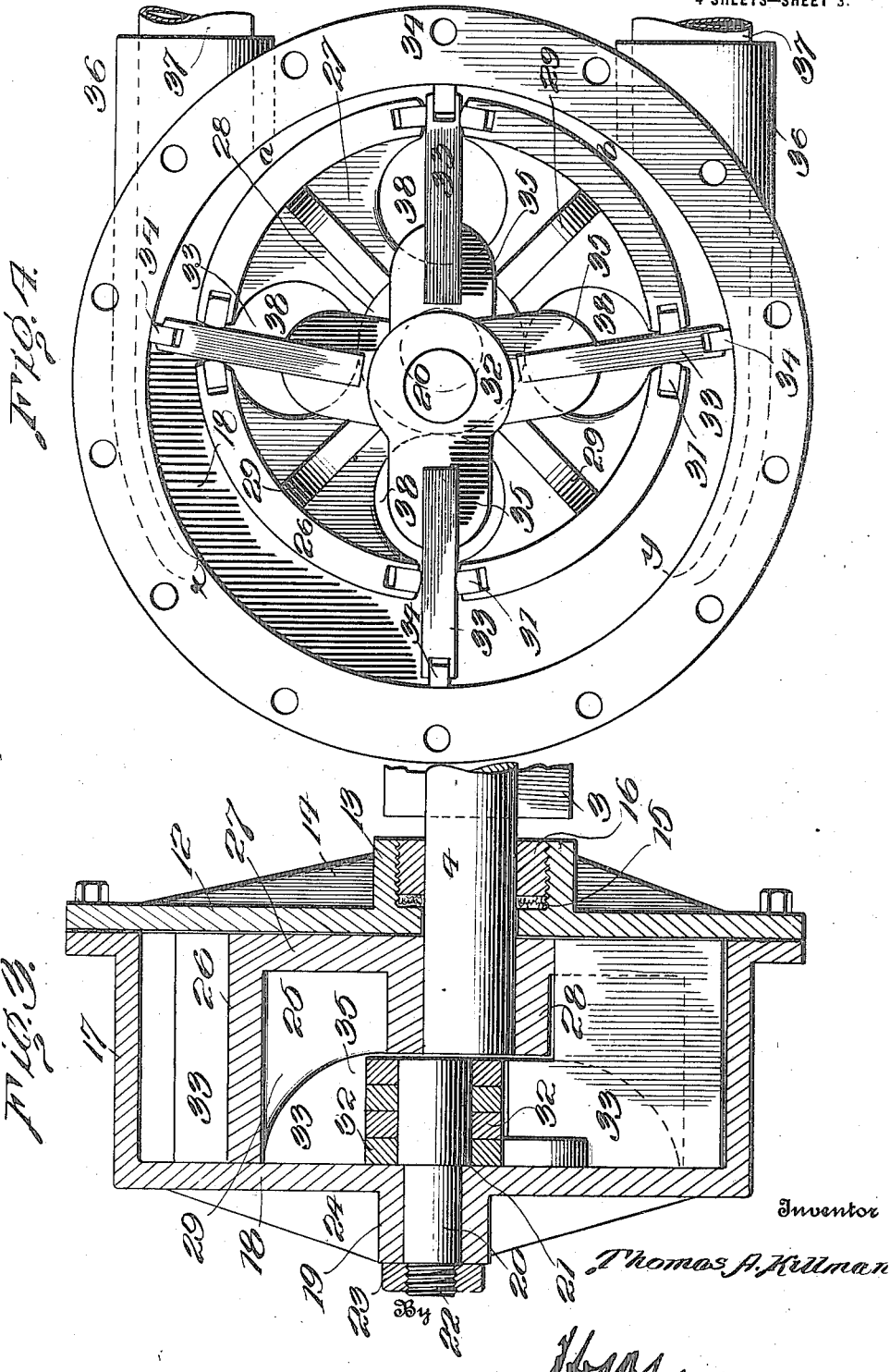

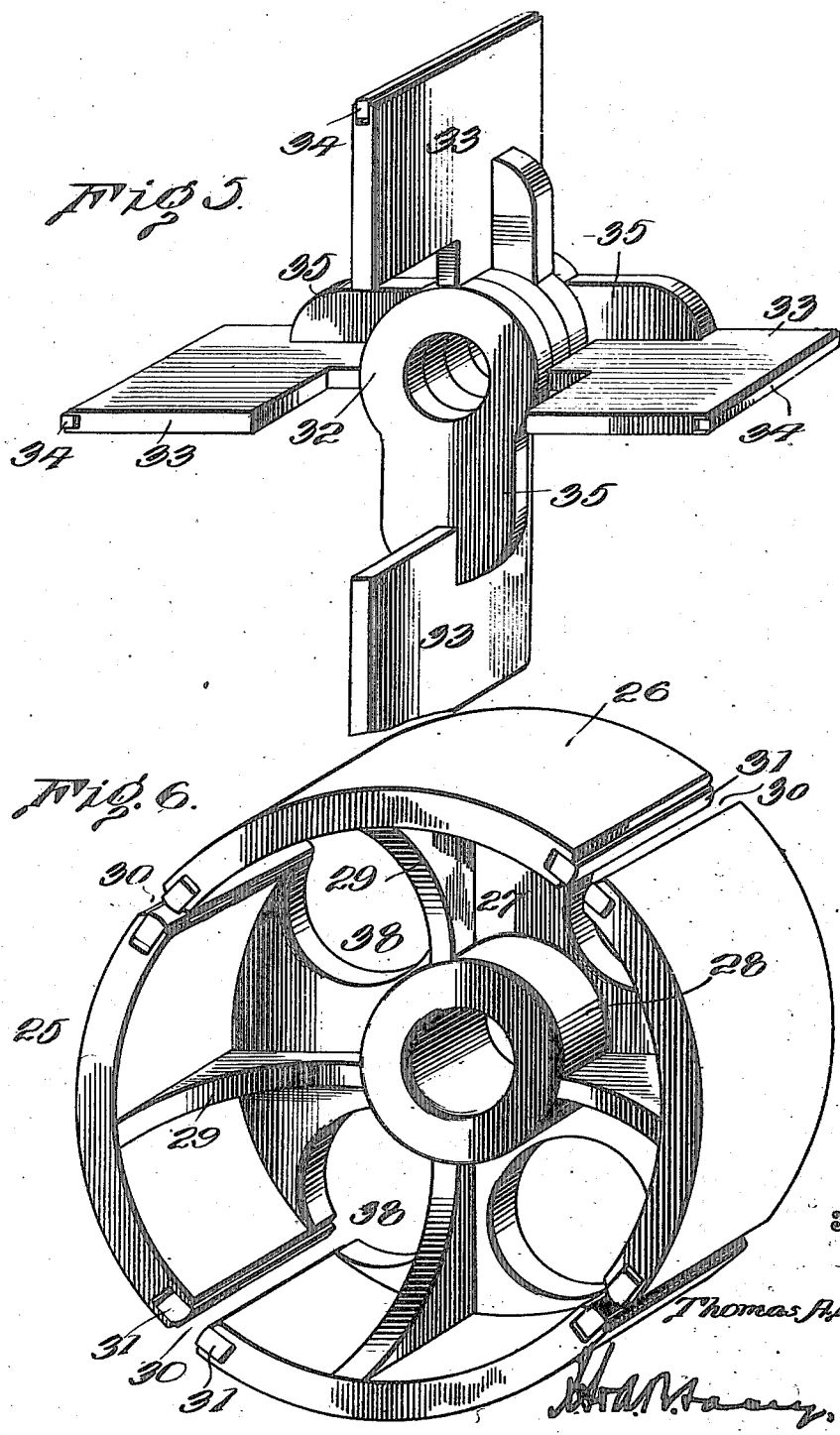

UNITED STATES PATENT OFFICE.

THOMAS A. KILLMAN, OF NASHVILLE, TENNESSEE, ASSIGNOR TO KILLMAN HYDRAULIC POWER TRANSMISSION COMPANY, OF TULLAHOMA, TENNESSEE, A CORPORATION OF TENNESSEE.

MOTOR OR PUMP.

1,221,333.  Specification of Letters Patent.  Patented Apr. 3, 1917.

Application filed April 28, 1915. Serial No. 24,534.

*To all whom it may concern:*

Be it known that I, THOMAS A. KILLMAN, a citizen of the United States, residing at Nashville, in the county of Davidson and State of Tennessee, have invented certain new and useful Improvements in Motors or Pumps, of which the following is a specification.

This invention relates to rotary motors or pumps, and has for its object the provision of a simple and efficient mechanism which may be operated either as a motor or a pump, and may be actuated so as to rotate a driven shaft or machinery in either direction.

A further object of the invention is to provide a mechanism for the stated purpose which will be free of vibration and which will be composed of few parts all of which will be of light weight and small size and do the work now requiring larger and heavier machines.

A still further object of the invention is to provide an apparatus for the stated purpose which will not be dependent upon the manipulation of valves for its successful operation, and other objects will appear as the description of the invention proceeds.

The invention resides in certain novel features which will be particularly pointed out in the claims following the detailed description, and is illustrated in the accompanying drawings, in which:—

Figure 1 is an elevation of one embodiment of a motor or pump containing my improvements;

Fig. 2 is a transverse section taken on the line 2—2 of Fig. 1;

Fig. 3 is a longitudinal section taken through the cylinder or casing;

Fig. 4 is an elevation with the head or face plate removed;

Fig. 5 is an enlarged perspective view of the blades or pistons;

Fig. 6 is an enlarged perspective view of the rotor; and

Fig. 7 is a detail perspective view of one of the blades.

In Fig. 1, I have illustrated an apparatus involving two cylinders and rotors, one cylinder and rotor constituting a pump and the other constituting a motor. It is to be understood, however, that one cylinder and rotor may be omitted and that either cylinder with the rotor contained therein may be operated as a pump or as a motor. The cylinders and rotors with the co-acting blades or pistons are duplicates in construction; and the description of either will suffice for both.

In carrying out the invention, I employ a base plate 1 to which a standard 2 is bolted or otherwise rigidly secured. In the upper ends of the standards 2, I provide bearings 3 in which the shaft 4 is journaled, said shaft, in the arrangement shown in Fig. 1, extending between the bearings on the two standards and carrying a band pulley or driving wheel 5 between the standards. Each standard has spaced feet 6 which are bolted to the base plate 1; and a web 7 connects the branches rising from the said feet.

Supporting arms 8 extend upwardly and outwardly beyond the bearings 3, and at the extremities of said arms and on the webs 7, I provide bosses or enlargements 9 which are adapted to receive bolts or screws 10 which engage co-acting bosses or enlargements 11 on the head or face plate 12 so as to secure the said head or face plate rigidly to the standard. The said head or face plate 12 is provided on its outer surface with an eccentrically located stuffing box or gland 13 through which the shaft 4 passes, as clearly shown in Fig. 3. Reinforcing ribs 14 are formed upon the outer surface of this head 12 and extend from the gland 13 toward the peripheral edge of the head so as to impart the necessary strength and rigidity to the head. The shaft 4 is not in contact with or journaled in the head 12 so that wear upon the head or the shaft at this point will be prevented and easy running qualities obtained. The provision of the gland 13 with its packing 15 and retaining nut 16 prevents possible leakage of fluid through the head around the shaft.

The head forms one end of a cylinder which is completed preferably by a body having a circular side 17 and an integral end or head 18 formed therewith, a boss or circular projection 19 being formed on the said head 18 at the center of the same. In the said boss or projection 19, I mount a stub shaft or pivot pin 20 which is provided with an annular shoulder 21 to engage against the inner surface of the said head and the outer extremity of the pivot pin is threaded, as shown at 22, to receive a retaining nut 23 which is adapted to be turned home against the end of the boss or projection 19 and thereby secure the stub shaft or pivot pin in place. Reinforcing ribs 24 are also formed upon the head 18 and extend from the boss 19, as shown and as will be readily understood.

Upon the inner end of the shaft 4, I rigidly secure, in any preferred manner, a rotor shell 25 consisting preferably of a cylindrical casting having a peripheral wall 26 and a radial end wall 27 extending from the peripheral wall 26 to a hub 28 which fits closely to and is secured upon the end of the shaft 4, as shown. Webs 29 may be provided to extend between the hub 28 and the peripheral wall 26 so as to reinforce this cylindrical rotor member, as will be readily understood. Longitudinal slots 30 are formed at equal intervals in the peripheral wall 26 and the opposed faces of the slots are recessed to carry packing strips 31 which may be of any suitable material and will preferably be projected by small springs fitted between the packing strips and the bases of the respective recesses. The shaft 4 extends nearly to the central radial plane of the cylinder, and the opposed end of the stub shaft or pivot 20 is also disposed adjacent the said center radial plane. Upon the inner portion of the pivot 20, I mount collars or rings 32 which are free to rotate about the said pivot and carry the blades or pistons 33. Upon reference to Fig. 3, it will be noted that the combined thickness of all the collars 32 is equal to the length of the inner portion of the pivot 20 so that the said collars will extend from the head 18 to the end of the pivot. The several blades 33 are substantially equal in width to the length of the casing 17 and are of such radial length that each will extend to and through a slot 30 in the rotor cylinder and bear against the inner peripheral surface of the casing. To avoid leakage past the blades, I provide packing strips 34 in the outer edges of the same, which bear against the inner peripheral surface of the cylindrical casing, as shown in Fig. 4, and as will be readily understood.

Upon reference to Figs. 5 and 7, it will be noted that each collar 32 has a radially projecting plate or arm 35 from which the blade 33 extends. These several arms 35 will, of course, be differently positioned relative to the respective blades so that each blade will extend between the two heads of the cylindrical casing without interfering with the movement of any other blade. The arms 35 also serve to provide an extended support for the blade swinging therefrom so that warping of the blades will be avoided and the strain exerted through them upon the rotor cylinder will be minimized. It will be noted upon reference to Fig. 4 more particularly, that I have illustrated an apparatus having four blades or pistons, although the number of blades or pistons is immaterial and, in the illustrated arrangement, the radial length of the blades which are in alinement will equal the diameter of the cylindrical casing and form a tight joint therewith.

The casing is provided with conduits 36 at opposite sides into which pipes 37 lead, one of said conduits being an inlet and the other conduit being an outlet, according to the direction of rotation of the rotor. It will be noted upon reference to Fig. 4, that the peripheral wall of the cylindrical casing is cut-away between the points $a$ and $x$, and between the points $b$ and $y$, so as to provide an extended inlet and outlet passage, but between the points $a$ and $b$ and the points $x$ and $y$, the surface is smooth and uninterrupted so that each piston or blade in traveling between such points will form a sealed joint with the casing.

It will be noted particularly upon reference to Fig. 4, that the cylindrical member of the rotor approaches close to the inner surface of the casing, between the points $a$ and $b$, while throughout the remaining portion of the casing it is spaced widely therefrom and, consequently, a crescent shaped space is provided between the rotor and the casing in which the fluid passing through the apparatus flows. Assuming that the device is being operated as a pump, power is applied through the wheel or pulley 5 so as to rotate the shaft 4 and the cylindrical member of the rotor carried by said shaft. The inlet conduit being connected to a source of supply, the liquid or other fluid enters the casing through said inlet, passing around through the said crescent shaped space to the outlet through which it escapes. Any fluid which may happen to be in advance of that rotor blade passing across the inlet opening will be forced by the said blade around through the crescent-shaped space and as a result of said action a partial vacuum will be formed in rear of the said blade so that additional fluid will be drawn into the casing. This additional charge will be caught by the next blade and will be forced by it around through the casing and the outlet from which it will be expelled with considerable force. Each blade repeats the operation so that a continuous flow of liquid or gas is obtained equal in volume to a cross section of the crescent-shaped cavity or space at its largest point.

The distance between the points $x$ and $y$ is such that, while one blade is just leaving this surface, the one immediately in rear of such blade is just entering it, or, in other words, while one blade is at $y$, the next blade will be at $x$, so that there is always a sealed joint on the working space so that nothing can pass through the pump in either direction unless it is forced through by the blades. At the opposite side of the pump between the points $a$ and $b$, the internal surface is left intact so as to form a sealed joint on this side also. A small portion of the fluid may be carried back over this surface by the blades, but as the rotor cylinder is at this side close to the wall of the casing, the amount so carried back will be very slight compared with the amount carried forward on the opposite side of the pump so that the net result will be a large output inasmuch as the pump can be operated at a very high speed.

When the device is to be operated as a motor, liquid or gas is forced through the inlet under pressure and strikes upon the extended rotor blade on the working side between the points $x$ and $y$ and carries the blade around so that motion will be imparted through the same to the rotor cylinder and thence to the shaft 4, which may be connected to any machinery to be driven. As the propelling fluid reaches the outlet from the casing, it will escape therethrough and cease its direct action upon the rotor. In the meanwhile, however, other blades will have been successively brought into the path of the inflowing driving fluid and the rotor will be continuously driven. It is evident that the apparatus may be driven in either direction whether operated as a motor or as a pump.

It will be noted that the rotor blades and the rotor cylinder each rotates about its own axis, although they are disposed eccentric to each other, and the movement of the blades radially with respect to the rotor cylinder will not cause any vibration of any of the parts no matter how high the speed at which the device is operated. The blades will move smoothly through the slots in the rotor cylinder, and the relative eccentric disposition of the said cylinder will cause the blades to gradually project to a greater extent from the said cylinder and then gradually withdraw into the cylinder so that, as the blades move into the field of the incoming liquid, they will extend merely across the same and, consequently, there will be no sudden shock but a gradual application of the force whether the device is working as a motor or a pump.

Openings 38 are provided in the end plate of the rotor cylinder so as to accommodate the edges of the blades, and these openings, of course, are located between the reinforcing ribs 29. While radial slots will give the needed clearance for the blades, I prefer to make enlarged openings, as illustrated, so that the frictional resistance will be minimized and the weight of the rotor will be reduced without sacrificing its durability or efficiency. It will also be noted that if the bolts securing the wall 17 to the head 12 be removed, the casing consisting of the head 18 and the said peripheral wall 17, together with the pivot pin and the blades mounted thereon, may be withdrawn bodily from the head 12 and the cylindrical member of the rotor and this facility of separating the parts is very advantageous in assembling the motor or disassembling the same for the purpose of cleaning, repairing or renewing any member. It will also be noted that the flared formation of the ribs 29 permits the cylindrical member of the rotor to fit over and around the collars which constitute the hubs or pivotal supports for the blades so that a large number of blades may be employed and the width of the blades may be equal to the axial length of the cylindrical casing.

Having thus described the invention, what is claimed as new is:—

1. The combination of a cylindrical casing having an inlet and an outlet, a rotor mounted eccentrically within the casing and comprising a hub, a peripheral wall and an end plate connecting one edge of the peripheral wall with the outer end of the hub, the opposite edge of the peripheral wall being free and the inner end of the hub being disposed between the radial plane of the edges of the peripheral wall, a plurality of collars rotatably mounted concentrically upon the wall of the casing adjacent but opposed to the hub of the rotor, and blades extending from the respective collars through the rotor to bear upon the inner surface of the casing.

2. The combination of a stationary cylindrical casing, a rotary shaft extending through one end of the casing and eccentric thereto, a pin fixed in the opposite end of the casing and concentric therewith, said casing consisting of a head through which the shaft extends, a second head carrying the pin, and a peripheral wall extending from said second head and secured to the first-mentioned head, a plurality of blades loosely mounted on said pin and radiating therefrom, and a rotor comprising a hub fixed on the inner end of said shaft and having its inner end adjacent the inner end of the said pin, a peripheral wall extending between the ends of the casing concentric with said hub, an end plate connecting the outer end of the hub with one edge of the said peripheral wall, and ribs connecting the inner end of the hub with the opposite edge of the peripheral wall, said ribs being flared outwardly to accommodate the pivotal portions of the blades and the blades extending through and having sliding engagement with the peripheral wall.

In testimony whereof I affix my signature in presence of two witnesses.

THOMAS A. KILLMAN. [L. S.]

Witnesses:
F. M. STEGER,
E. H. ROY.